United States Patent [19]

Zankovich

[11] Patent Number: 4,948,313
[45] Date of Patent: Aug. 14, 1990

[54] NUT PLATFORM FOR FRAMING CHANNELS

[75] Inventor: Thomas J. Zankovich, Long Beach, Calif.

[73] Assignee: Wesanco, Inc., La Mirada, Calif.

[21] Appl. No.: 275,774

[22] Filed: Nov. 23, 1988

[51] Int. Cl.$^5$ ............................................. F16B 27/00
[52] U.S. Cl. ..................................... 411/85; 411/103; 52/710
[58] Field of Search ............... 411/84, 85, 101, 103, 411/104, 112, 432, 965, 966; 52/710

[56] References Cited

U.S. PATENT DOCUMENTS

| | | | |
|---|---|---|---|
| 1,172,664 | 2/1916 | Banes | 52/710 |
| 1,621,877 | 3/1927 | Fitzgerald | 52/710 |
| 2,345,650 | 4/1944 | Attwood | 52/710 |
| 3,020,946 | 2/1962 | Mills | 411/85 |
| 3,620,277 | 11/1971 | Tummarello | 52/710 X |
| 4,130,977 | 12/1978 | Taylor, Jr. et al. | 52/710 |
| 4,263,952 | 4/1981 | Kowalski | 411/112 |
| 4,741,582 | 5/1988 | Peroni | 411/85 X |

FOREIGN PATENT DOCUMENTS

| | | | |
|---|---|---|---|
| 537066 | 2/1957 | Canada | 52/710 |
| 1218264 | 1/1971 | United Kingdom | 411/112 |

*Primary Examiner*—Gary L. Smith
*Assistant Examiner*—Flemming Saether
*Attorney, Agent, or Firm*—Fliesler, Dubb, Meyer & Lovejoy

[57] ABSTRACT

An improved device for securing a structural member to a generally U-shaped longitudinally extending channel member is set forth. A bridge section connects together two generally parallel sidewall sections with the sidewall sections each having a respective lip which extends inwardly laterally towards the other sidewall section and bends towards and ends a spaced distance from the bridge section. A first nut has oppositely extending lateral arms which are adapted for positioning beneath and are engageable with the lips. A bolt can be threaded into a threaded opening in the nut. The improvement is a support member positionable between the bridge section and the lips and between the sidewall sections. The support member has a pair of lateral sides, each positionable adjacent and facing a respective one of the sidewall sections. It also has a pair of ends alignable along the channel member. The support member defines a cavity generally orthogonal to the lateral sides and to the ends. The cavity is positionable in facing relation to the lips. It is adapted to retain the nut with its lateral arms beneath the lips. The support is prevented from rotating sufficiently to align the lateral sides along the channel member.

14 Claims, 3 Drawing Sheets

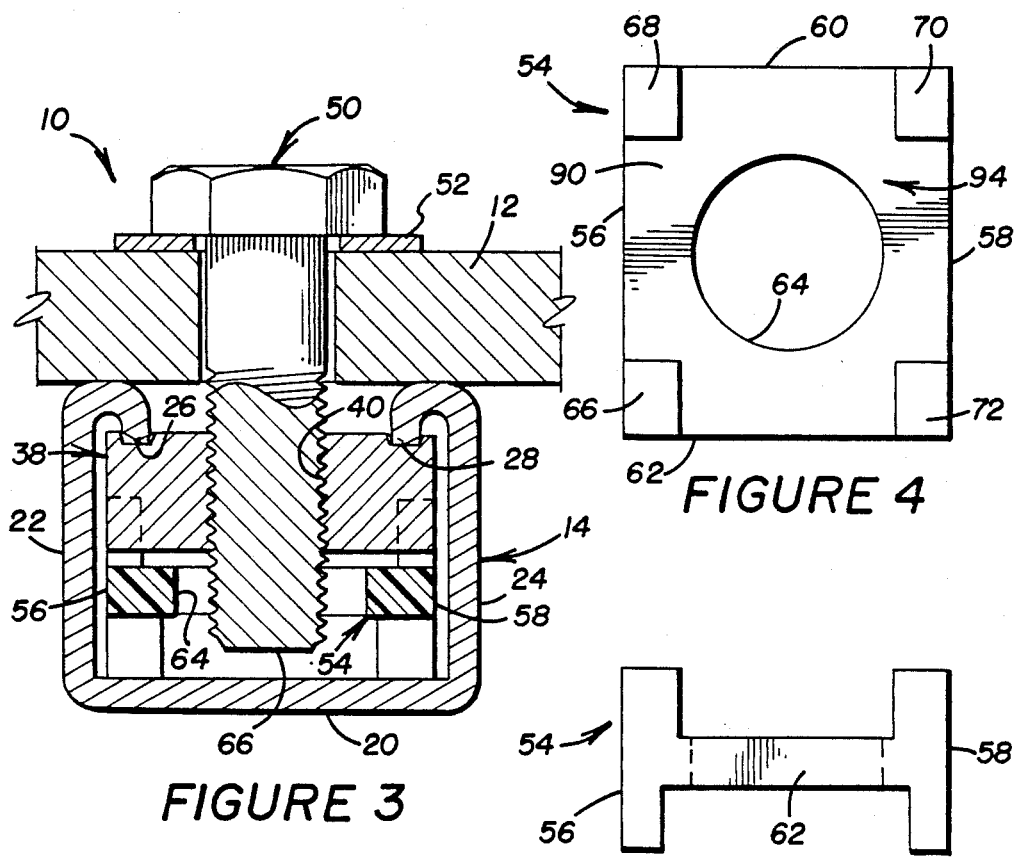
FIGURE 3
FIGURE 4
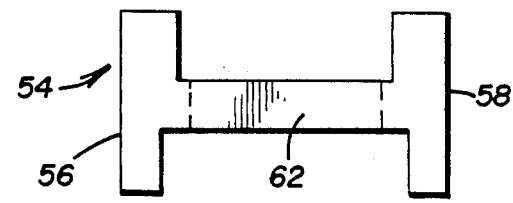
FIGURE 5
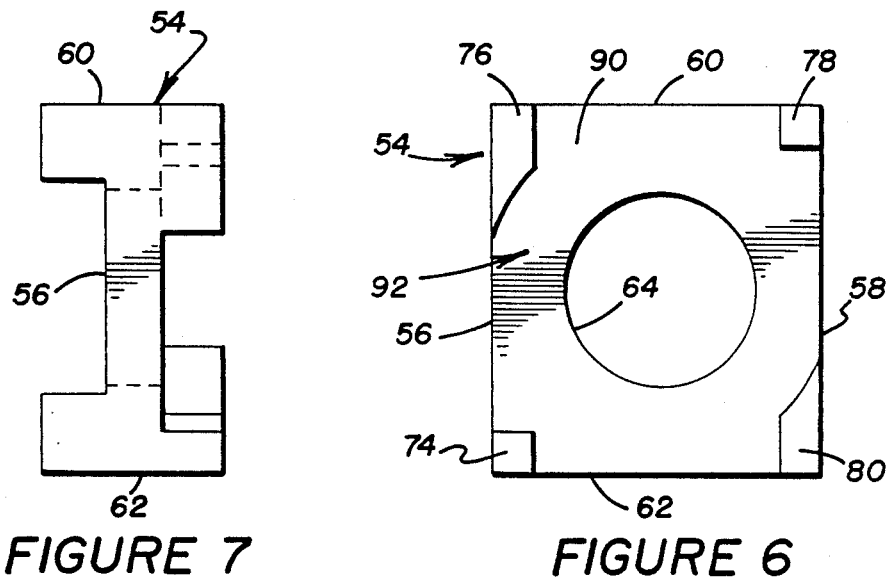
FIGURE 7
FIGURE 6

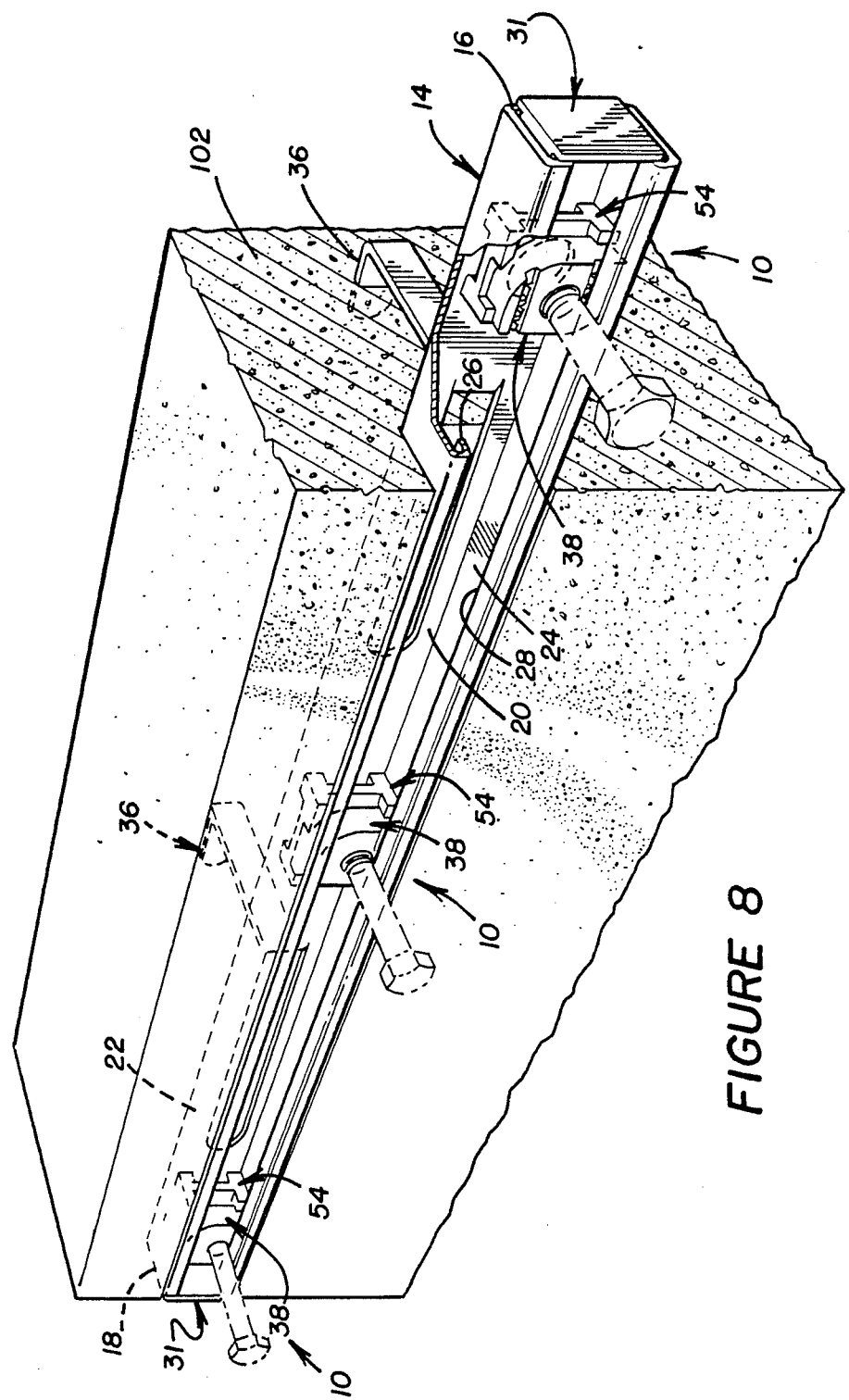

NUT PLATFORM FOR FRAMING CHANNELS

TECHNICAL FIELD

The present invention relates to U-shaped structural framing channel members and, more particularly, to a device in the nature of a platform which serves for holding a nut in such a channel member in proper orientation for receiving a bolt.

BACKGROUND ART

U-shaped metal channel members are used by the construction industry for a number of tasks. For example, curtain walls on the outside of high-rise buildings can be mounted to such channel members when such channel members are used as so-called embeds in concrete. In such an instance the channel members have anchors (extending parts) attached to them which become embedded in concrete. The channel members are generally attached to the form into which concrete is being poured, for example, using nails. After the concrete has been poured and has set, the open portion of the U-shaped channel member (which is usually blocked off with a plastic closure during concrete pouring) faces outwardly along the wall of the building. Structural members such as curtain wall clips can be attached to the embedded U-shaped channel members utilizing nuts which fit into the U-shaped members and bolts which attach to the nuts. The U-shaped members have lips which extend inwardly and then downwardly a small distance towards the bridge portion of the U-shaped channel member. The nuts generally have grooves in them which bear teeth and which are positioned so as to engage with the lips when bolts are tightened into the nuts.

Such U-shaped channel members are also used to support light fixtures and other devices, in which instance the open portion or mouth of the channel members often face downwardly.

In most instances the prior art nuts have had a coil spring attached to them which extended from the nut and biased against the inside of the bridge portion of the U-shaped channel member. Such nuts are generally referred to as channel nuts with springs but are sometimes referred to herein as nut-springs for brevity. The attachment of the springs to the nuts is an expensive task whereby the nuts themselves are relatively expensive. Also, since only the springs hold the nuts in place it is not generally possible to preposition the nuts in the U-shaped channels as they will normally be knocked out of position during routine shipping and/or handling. In such an instance the workman would have to reach his fingers inside the channel, compress the spring against the bottom of the nut, rotate the nut-spring combination until the nut was properly aligned and then push it to the position desired along the U-shaped channel. In practice the nut-spring combinations are not prepositioned. Instead, the nut-spring is supplied separate from the channel and the workman carries a supply of such nut-spring combinations, compresses them between his thumb and forefinger, when needed, inserts them in a channel with the long axis of the nut parallel to the length of the channel, and then rotates the nut 90° so as to properly align it whereby the structural member can be attached by a bolt to the nut. All of this is time consuming and even dangerous, particularly in high-rise construction, since the nut-springs can be dropped and can injure a person below. Also, the dropping of the nut-spring requires the workman to carry an extra supply of nut-spring or to go back for additional nut-springs when one is lost, thereby lengthening the construction task and increasing inventory.

Some attempts have been made in the past to fasten channel nuts in position on the U-shaped channel member so that they could be preloaded by the supplier of the channel member in order to alleviate the problems mentioned above. For example, U.S. Pat. No. 4,263,952, issued to Kowalski on Apr. 28, 1981 shows a structure wherein the channel nut is mounted to a bracket which is itself mounted across the mouth of the U-shaped member and can be slid along the U-shaped member to a desired position. Such a structure is useful but has certain restrictions. For example, assembly of the bracket and nut combination to the U-shaped member can be time consuming. And, the brackets can be expensive. Furthermore, some modification may be necessary of the relatively inexpensive channel nut in order to make it properly mountable in such a bracket. Also, since the bracket rides upon the mouth of the U-shaped member it is not possible to snap a plastic insert in place over the mouth of the U-shaped member to prevent entrance therein of concrete in those instances when the U-shaped member is used as an embed in concrete. Another problem with the type of bracket discussed above is that each such bracket will mount only a single sized nut whereby different sized and shaped brackets must be maintained in stock for different sized nuts, thereby adding to stocking problems.

The present invention is directed to overcoming one or more of the problems as set forth above.

DISCLOSURE OF INVENTION

In accordance with the present invention an improvement is set forth in a device for securing a structural member to a generally U-shaped longitudinally extending frame member having first and second ends, a bridge section, and two generally parallel sidewall sections having respective lips extending inwardly laterally and bending towards and ending a spaced distance from the bridge section. A nut has a generally central threaded opening in it and oppositely extending lateral arms which are adapted for positioning between the lips and the U-shaped member with the arms having means for engaging with each of the lips. A bolt is adapted to be threaded into the threaded opening. The improvement of the invention is in the nature of a support member positionable between the bridge section and the lips and between the sidewall sections. The support member has a pair of lateral sides, each positionable adjacent and facing a respective one of the sidewall sections. The support member has a first cavity generally orthogonal to the lateral sides and to the ends. The first cavity is positionable in facing relation to the lips. It is adapted to retain the nut with the lateral arms beneath the lips. The lateral sides of the support member are positionable sufficiently close to the sidewall sections to prevent sufficient rotation of the support, when positioned with its lateral sides adjacent the sidewall sections, to align the lateral sides transverse of the longitudinal axis of the frame member.

A support member as set forth above allows channel nuts to be properly positioned, and to be preloaded, in U-shaped channel members. The support member provides a positive holding action for the channel nuts whereby they cannot be knocked out of position during handling thus relieving the workman from the task of inserting and positioning channel nuts while, for example, working at heights of many hundreds of feet above street level. Furthermore, the support members can be made very inexpensively, for example by molding techniques, whereby the expense of attaching a spring to a channel nut is eliminated. And, in accordance with certain embodiments of the present invention the support member can be turned upside down and a different size channel nut can be mounted on the opposite side of the support member, if desired, whereby a single support member can serve for two different sized channel nuts. Insertion of the support members into a U-shaped channel member, along with a channel nut, is a relatively easy task to accomplish. Indeed, in accordance with an embodiment of the present invention the support member is of a size and shape such that it can only be positioned in proper orientation within the channel member.

BRIEF DESCRIPTION OF DRAWINGS

The invention will be better understood by reference to the figures of the drawings wherein like numbers denote like parts throughout and wherein:

FIG. 3 illustrates a view taken along the line III—III of FIG. 2, with the bolt fully in position and with a structural member also in position;

FIG. 4 illustrates, in side view, a support member useful in accordance with an embodiment of the present invention;

FIG. 5 illustrates a view of the support member of FIG. 4 taken from either end;

FIG. 6 illustrates, in opposite side view to that of FIG. 4, a support member in accordance with an embodiment of the present invention;

FIG. 7 illustrates a side view of the embodiment of FIG. 6 taken from either the front or the back; and FIG. 8 illustrates an imbed including support members, all in accordance with an embodiment of the present invention.

BEST MODE FOR CARRYING OUT INVENTION

Figure 1:
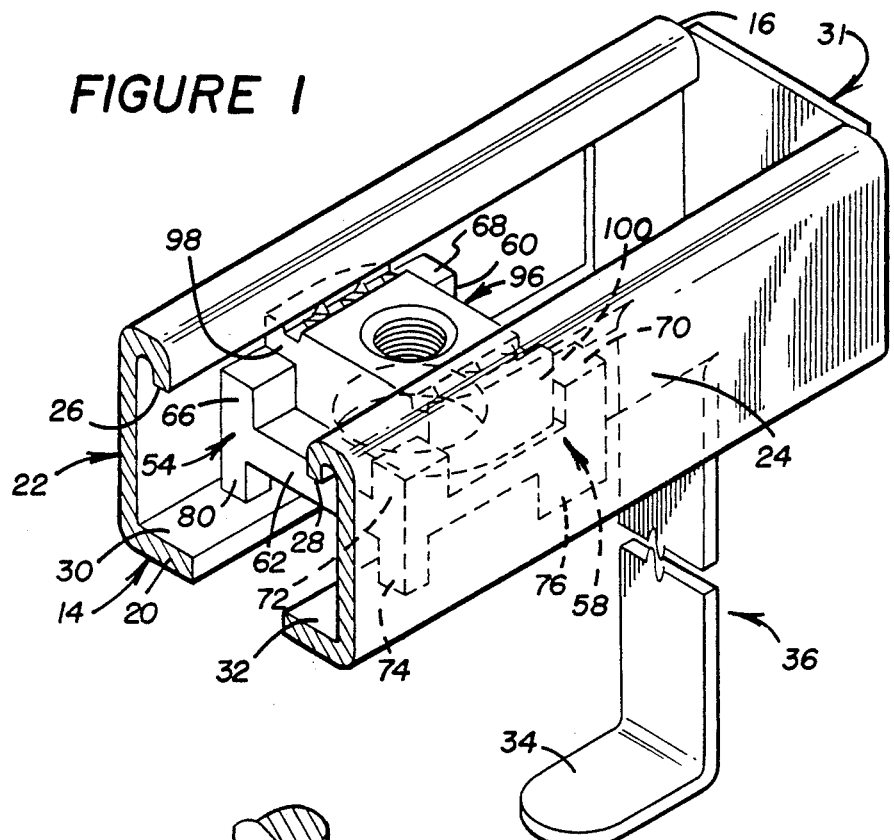
FIG. 1 illustrates, in isometric partial section view, a device in accordance with an embodiment of the present invention.

The present invention relates to a device 10 for securing a structural member 12 to a generally U-shaped longitudinally extending channel (or frame) member 14 having a first end 16 and a second end 18 (FIG. 8). The longitudinally extending channel member 14 is formed of a bridge section 20 which connects together two generally parallel sidewall sections 22 and 24. The sidewall sections 22 and 24 each have a respective lip 26 and 28 which extends inwardly laterally towards the other one of the sidewall sections 22 and 24 and which bends towards and ends a spaced distance from the bridge section 20. End caps 31 are provided for blocking off the ends 16 and 18 of the frame member 14. The bridge section 20 has a pair of outer portions 30,32 adjacent the respective sidewall sections 22 and 24 and has a central portion 34 between the outer portions 30,32. In the embodiment of FIG. 1 the center section 34 has been punched out to form an anchor structure 36 (FIG. 8) which extends away from the frame member 14 in a direction opposite the direction of extension of the sidewall sections 22 and 24 from the bridge section 20.

Figure 2:
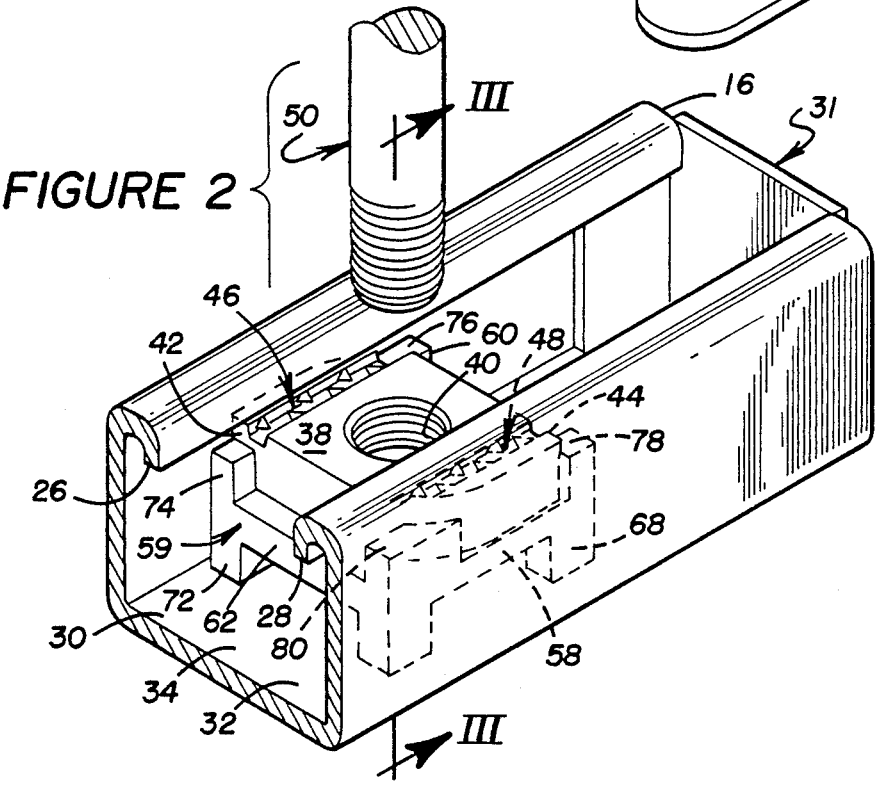
FIG. 2 illustrates, in a view similar to FIG. 1, a device in accordance with an embodiment of the present invention utilizing a different sized channel nut and with a bolt positioned for insertion.

A first nut 38, seen in FIGS. 2 and 3, has a generally central threaded opening 40 in it. The first nut 38 also has oppositely extending lateral arms 42,44 which are adapted for positioning beneath the lips 26,28 of the sidewall sections 22,24. The arms 42,44 have respective means 46,48, in the embodiment illustrated toothed grooves, for engaging with each of the respective lips 26,28. A bolt 50 is adapted to be threaded into the threaded opening 40 in the first nut 38. A washer 52 may be used along with the bolt 50 in order to secure the structural member 12 against the open end of the U-shaped channel member 14.

In accordance with the present invention a support member 54 is provided which is positionable between the bridge section 20 and the lips 26,28 and also between the sidewall sections 22,24. Such positioning is illustrated in FIGS. 1, 2 and 3. The support member 54 has a pair of lateral sides 56,58, each positionable adjacent and facing one of the sidewall sections 22,24. The support member 54 has a pair of ends 60,62 which are alignable transverse of the longitudinal axis of the frame member 14.

In accordance with an embodiment of the present invention, the support member 54, from one of its ends 60,62 to the other, is too long to be positioned in the frame member 14 with the ends 60,62 of the support member 54 facing the sidewall sections 22,24. This serves to assure that the support member 54 can only be inserted in the frame member 14 in proper alignment for accepting a nut 38. The support member 54 generally includes a generally central opening 64 through it which is generally aligned with, and larger than, the threaded opening 40 in the nut 38. This allows an end 66 of the bolt 50 to pass downwardly through the opening 64 as illustrated in FIG. 3.

The support member 54, in accordance with an embodiment of the present invention includes a plurality of feet 66,68,70,72,74,76,78 and 80, all as illustrated in FIGS. 4-7, which extend against the outer portions, 30,32 of the bridge section 20 and which are free from contact with the central portion 34 of the bridge section 20. Such is particularly advantageous as in the embodiment of FIG. 1 wherein the central portion 34 has been punched out to form the anchor structure 36. In such a structure the feet, either 66,68,70 and 72 or 74,76,78 and 80, depending upon the orientation of the support member 54, can slide along the outer portions 30,32 of the bridge 20 in an unhindered manner.

The four feet 74,76,78 and 80 along with a central platform 90 define a first cavity 92 which is generally orthogonal to the lateral sides 56 and 58 and to the ends 60 and 62 of the support member 54 with the first cavity 92 being selectively positionable either in facing relation to the lips 26 and 28 as in FIGS. 2 and 3 or in facing relation to the bridge 20 as in FIG. 1. The first cavity 92 is adapted to retain the first nut 38 with its lateral arms 42 and 44 beneath the lips 26 and 28 respectively. The lateral sides 56 and 58 of the support member 54 are positionable sufficiently close to the sidewall sections 22 and 24 to prevent sufficient rotation of the support member 54, when positioned with its lateral sides 56 and 58 adjacent the sidewall sections 22 and 24, to align the lateral sides 56 and 58 transverse of the longitudinal axis of the frame member 14. Thus, once the support member 54 is in position within the frame member 14 it is prevented from rotating so as to position the first nut 38 in other than its proper orientation relative to the lips 26 and 28.

In accordance with an embodiment of the present invention the support member 54 has a second cavity 94 defined by the platform 90 and by the legs 66,68,70 and 72. The second cavity 94 is adapted to hold a second nut 96, of the nature shown in FIG. 1, of a different size than the first nut 38, in such a manner that arms 98,100 of the second nut 96 must extend beneath the lips 26 and 28. The support member 54 is selectively positionable with the second cavity 94 in facing relation to the lips 26 and 28. In this manner, a single support member 54 can support nuts of two different sizes such as the first nut 38 and the second nut 96. In practice, two sizes of nuts are utilized in the construction industry whereby the support member 54 can be used for either of these commonly sized channel nuts.

FIG. 8 shows an embodiment where there are a plurality of the support members 54 and a corresponding plurality of the nuts 38, all poitioned in a single channel member 14. Such a structure is useful for mounting several structural members 12 to a single channel member 14 or for mounting a single structural member 12 at several locations to a single channel member 14. The embodiment of FIG. 8 also shows the anchor structure 36 held in concrete 102.

The support member 54 may be made of any desirable material but it has been found that it can be manufactured inexpensively from plastic utilizing common molding techniques. Any of a number of plastics can be utilized, for example, polypropylene, polyethylene, polyvinylchloride or any other desirable material. Indeed, the support member 54 can be made of metal, if desired, or even of wood. However, such is significantly more expensive.

In use one or more support members 54 have an appropriate first nut 38 or second nut 96 positioned in a respective first cavity 92 or second cavity 94. The support member 54 is introduced into one of the ends 16,18 of the channel member 14 with the nut containing cavity 92 or 94 facing the lips 26,28 and with the arms 42,44 or 98,100 of the nut 38 or 96 beneath the lips 26,28. After sufficient support members 54 have been loaded into the channel member 14, the ends 16,18 are closed off with end caps 31. The workman on the job needs only to slide each needed support member 54 along the channel member 14 until it reaches a desired position before fastening the structural member 12 in place using an appropriately sized bolt 50.

INDUSTRIAL APPLICABILITY

The present invention provides a device for fastening a support member 12 to a U-shaped channel member 14, particularly of the nature of an embed as is used in high-rise construction for attaching curtain walls and other structures. It is also useful for mounting lighting fixtures or the like at ceiling level.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. In a device for securing a structural member to a generally U-shaped longitudinally extending channel member having a longitudinal axis therealong, first and second ends, a bridge section, and two generally parallel sidewall sections connected together by said bridge section, said sidewall sections each having a respective lip extending inwardly laterally towards the respective other sidewall section and bending towards and ending a spaced distance from said bridge section; a first nut having a generally central threaded opening therein and oppositely extending lateral arms adapted for positioning beneath said lips, said arms having respective means for engaging with each of said respective lips; and a bolt adapted to be threaded into said threaded opening, an improvement comprising:

a support member positionable between said bridge section and said lips and between said sidewall sections, said support member having a pair of lateral sides, each positionable adjacent and facing a respective one of said sidewall sections, a pair of ends alignable transverse to said longitudinal axis and a first cavity generally orthogonal to said lateral sides and to said ends, said first cavity being positionable in facing relation to said lips, said first cavity being adapted to retain said first nut with said lateral arms beneath said lips, said lateral sides being positionable sufficiently close to said sidewall sections to prevent sufficient rotation of said support member, when positioned with its lateral sides adjacent said sidewall sections, to align said lateral sides transverse to said longitudinal axis;

end caps blocking off said first and second ends of said channel member; and wherein said support member has a second cavity facing oppositely from said first cavity, said support member being selectively positionable with said second cavity in facing relation to said lips, said second cavity being adapted to hold a second nut having a generally central threaded opening therein and oppositely extending lateral arms, said second nut being of a different size than said first nut, in such a manner that the arms of the second nut extend beneath said lips.

2. A device as set forth in claim 1, including a plurality of said support members and a corresponding plurality of said nuts, all positioned in said channel member.

3. A device as set forth in claim 2, wherein said support member, from one of its ends to the other, is too large to be positioned in said channel member with said ends of said support member facing said sidewall sections.

4. A device as set forth in claim 3, wherein said support member has a generally central opening therein generally aligned with and larger than said threaded opening.

5. A device as set forth in claim 4, wherein said bridge section has a pair of outer portions adjacent said sidewall sections and a central portion between said outer portions and wherein said support member includes a plurality of feet extending against said outer portions and free from contact with said central portion.

6. In a device for securing a structural member to a generally U-shaped longitudinally extending channel member having a longitudinal axis therealong, first and second ends, a bridge section, and two generally parallel sidewall sections connected together by said bridge section, said sidewall sections each having a respective lip extending inwardly laterally towards the respective other sidewall section and bending towards and ending a spaced distance from said bridge section; a first nut having a generally central threaded opening therein and oppositely extending lateral arms adapted for positioning beneath said lips, said arms having respective means for engaging with each of said respective lips; and a bolt adapted to be threaded into said threaded opening, an improvement comprising:

a support member positionable between said bridge section and said lips and between said sidewall sections, said support member having a pair of lateral sides, each positionable adjacent and facing a respective one of said sidewall sections, a pair of ends alignable transverse to said longitudinal axis and a first cavity generally orthogonal to said lateral sides and to said ends, said first cavity being positionable in facing relation to said lips, said first cavity being adapted to retain said first nut with said lateral arms beneath said lips, said lateral sides being positionable sufficiently close to said sidewall sections to prevent sufficient rotation of said support member, when positioned with its lateral sides adjacent said sidewall sections, to align said lateral sides transverse to said longitudinal axis; and wherein said support member has a second cavity facing oppositely from said first cavity, said support member being selectively positionable with said second cavity in facing relation to said lips, said second cavity being adapted to hold a second nut having a generally central threaded opening therein and oppositely extending lateral arms, said second nut being of a different size than said first nut, in such a manner that the arms of the second nut extend beneath said lips.

7. A device as set forth in claim 6, including a plurality of said support members and a corresponding plurality of said nuts, all positioned in said channel member.

8. A device as set forth in claim 7, wherein said support member, from one of its ends to the other, is too large to be positioned in said channel member with said ends of said support member facing said sidewall sections.

9. A device as set forth in claim 8, wherein said support member has a generally central opening therein generally aligned with and larger than said threaded opening.

10. A device as set forth in claim 9, wherein said bridge section has a pair of outer portions adjacent said sidewall sections and a central portion between said outer portions and wherein said support member includes a plurality of feet extending against said outer portions and free from contact with said central portion.

11. In a device for securing a structural member to a generally U-shaped longitudinally extending channel member having a longitudinal axis therealong, first and second ends, a bridge section, and two generally parallel sidewall sections connected together by said bridge section, said sidewall sections each having a respective lip extending inwardly laterally towards the respective other sidewall section and bending towards and ending a spaced distance from said bridge section; a first nut having a generally central threaded opening therein and oppositely extending lateral arms adapted for positioning beneath said lips, said arms having respective means for engaging with each of said respective lips; and a bolt adapted to be threaded into said threaded opening, an improvement comprising:

a support member positionable between said bridge section and said lips and between said sidewall sections, said support member having a pair of lateral sides, each positionable adjacent and facing a respective one of said sidewall sections, a pair of ends alignable transverse to said longitudinal axis and a first cavity generally orthogonal to said lateral sides and to said ends, said first cavity being positionable in facing relation to said lips, said first cavity being adapted to retain said first nut with said lateral arms beneath said lips, said lateral sides being positionable sufficiently close to said sidewall sections to prevent sufficient rotation of said support member, when positioned with its lateral sides adjacent said sidewall sections, to align said lateral sides transverse to said longitudinal axis;

wherein said support member, from one of its ends to the other, is too large to be positioned in said channel member with said ends of said support member facing said sidewall sections;

wherein said support member has a generally central opening therein generally aligned with and larger than said threaded opening; and wherein said bridge section has a pair of outer portions adjacent said sidewall sections and a central portion between said outer portions and wherein said support member includes a plurality of feet extending against said outer portions and free from contact with said central portion.

12. In a device for securing a structural member to a generally U-shaped longitudinally extending channel member having a longitudinal axis therealong, first and second ends, a bridge section, and two generally parallel sidewall sections connected together by said bridge section, said sidewall sections each having a respective lip extending inwardly laterally towards the respective other sidewall section and bending towards and ending a spaced distance from said bridge section; a first nut having a generally central threaded opening therein and oppositely extending lateral arms adapted for positioning beneath said lips, said arms having respective means for engaging with each of said respective lips; and a bolt adapted to be threaded into said threaded opening, an improvement comprising:

a support member positionable between said bridge section and said lips and between said sidewall sections, said support member having a pair of lateral sides, each positionable adjacent and facing a respective one of said sidewall sections, a pair of ends alignable transverse to said longitudinal axis and a first cavity generally orthogonal to said lateral sides and to said ends, said first cavity being positionable in facing relation to said lips, said first cavity being adapted to retain said first nut with said lateral arms beneath said lips, said lateral sides being positionable sufficiently close to said sidewall sections to prevent sufficient rotation of said support member, when positioned with its lateral sides adjacent said sidewall sections, to align said lateral sides transverse to said longitudinal axis;

wherein said support member has a generally central opening therein generally aligned with and larger than said threaded opening; and wherein said bridge section has a pair of outer portions adjacent said sidewall sections and a central portion between said outer portions and wherein said support member includes a plurality of feet extending against said outer portions and free from contact with said central portion.

13. In a device for securing a structural member to a generally U-shaped longitudinally extending channel member having a longitudinal axis therealong, first and second ends, a bridge section, and two generally parallel sidewall sections connected together by said bridge section, said sidewall sections each having a respective lip extending inwardly laterally towards the respective other sidewall section and bending towards and ending a spaced distance from said bridge section; a first nut having a generally central threaded opening therein and oppositely extending lateral arms adapted for positioning beneath said lips, said arms having respective means for engaging with each of said respective lips; and a bolt adapted to be threaded into said threaded opening, an improvement comprising:

a support member positionable between said bridge section and said lips and between said sidewall sections, said support member having a pair of lateral sides, each positionable adjacent and facing a respective one of said sidewall sections, a pair of ends alignable transverse to said longitudinal axis and a first cavity generally orthogonal to said lateral sides and to said ends, said first cavity being positionable in facing relation to said lips, said first cavity being adapted to retain said first nut with said lateral arms beneath said lips, said lateral sides being positionable sufficiently close to said sidewall sections to prevent sufficient rotation of said support member, when positioned with its lateral sides adjacent said sidewall sections, to align said lateral sides transverse to said longitudinal axis; and wherein said bridge section has a pair of outer portions adjacent said sidewall sections and a central portion between said outer portions and wherein said support member includes a plurality of feet extending against said outer portions and free from contact with said central portion.

14. In a device for securing a structural member to a generally U-shaped longitudinally extending channel member having a longitudinal axis therealong, first and second ends, a bridge section, and two generally parallel sidewall sections connected together by said bridge section, said sidewall sections each having a respective lip extending inwardly laterally towards the respective other sidewall section and bending towards and ending a spaced distance from said bridge section; a first nut having a generally central threaded opening therein and oppositely extending lateral arms adapted for positioning beneath said lips, said arms having respective means for engaging with each of said respective lips; and a bolt adapted to be threaded into said threaded opening, an improvement comprising:

a support member positionable between said bridge section and said lips and between said sidewall sections, said support member having a pair of lateral sides, each positionable adjacent and facing a respective one of said sidewall sections, a pair of ends alignable transverse to said longitudinal axis and a first cavity generally orthogonal to said lateral sides and to said ends, said first cavity being positionable in facing relation to said lips, said first cavity being adapted to retain said first nut with said lateral arms beneath said lips, said lateral sides being positionable sufficiently close to said sidewall sections to prevent sufficient rotation of said support member, when positioned with its lateral sides adjacent said sidewall sections, to align said lateral sides transverse to said longitudinal axis; and wherein said bridge section has a pair of outer portions adjacent said sidewall sections and a central portion between said outer portions and wherein said support member includes foot portions extending against said outer portions and free from contact with said central portion.

* * * * *